United States Patent
Zoller, IV et al.

(10) Patent No.: US 12,229,580 B2
(45) Date of Patent: Feb. 18, 2025

(54) DEPLOYING VIRTUAL MACHINES TO A VIRTUALIZATION MANAGEMENT ENVIRONMENT USING AN AGENT TO OBTAIN REMOTE VIRTUAL MACHINE TEMPLATES

(71) Applicant: Dell Products L.P., Round Rock, TX (US)

(72) Inventors: Linwood W. Zoller, IV, Lexington, KY (US); Daniel E. Cummins, Hudson, NH (US); David Jensen, Dallas, TX (US)

(73) Assignee: Dell Products L.P., Round Rock, TX (US)

( * ) Notice: Subject to any disclaimer, the term of this patent is extended or adjusted under 35 U.S.C. 154(b) by 465 days.

(21) Appl. No.: 17/719,677

(22) Filed: Apr. 13, 2022

(65) Prior Publication Data
US 2023/0333869 A1    Oct. 19, 2023

(51) Int. Cl.
   *G06F 9/455*   (2018.01)
(52) U.S. Cl.
   CPC ........... *G06F 9/45558* (2013.01); *G06F 2009/45562* (2013.01); *G06F 2009/4557* (2013.01); *G06F 2009/45595* (2013.01)
(58) Field of Classification Search
   CPC .................................................. G06F 9/45558
   See application file for complete search history.

(56) References Cited

U.S. PATENT DOCUMENTS

| | | | |
|---|---|---|---|
| 2013/0326503 A1* | 12/2013 | De | G06F 9/45558 718/1 |
| 2015/0248554 A1* | 9/2015 | Dumitru | G06F 21/56 718/1 |

OTHER PUBLICATIONS

"Tutorial: Deploying a virtual machine in Cloud Assembly", https://docs.vmware.com/en/vRealize-Automation/services/Using-and-Managing-Cloud-Assembly/GUID-FE281F74-88F7-47ED-A566-56E700514EF3.html, Updated on Feb. 17, 2022, downloaded Apr. 7, 2022.

(Continued)

*Primary Examiner* — Charlie Sun
(74) *Attorney, Agent, or Firm* — Ryan, Mason & Lewis, LLP

(57) ABSTRACT

Techniques are provided for deploying virtual machines to a virtualization management environment using an agent component to obtain remote virtual machine templates. One method comprises receiving, by an agent component executing in a virtualization management server, a request to deploy a virtual machine and a storage location of a template for the virtual machine; obtaining the template for the virtual machine from one or more of an orchestration engine and a remote data source identified by the storage location; and replicating the obtained template for the virtual machine to create the virtual machine. The request to deploy the virtual machine may also comprise deployment information used to configure the virtual machine. The agent component may monitor an execution of the created virtual machine and evaluate one or more policies provided by the orchestration engine with respect to security controls and/or network requirements associated with the created virtual machine.

20 Claims, 6 Drawing Sheets

(56) References Cited

OTHER PUBLICATIONS

Marko, Kurt, "Manage Google cloud instances with images, templates", https://www.techtarget.com/searchcloudcomputing/tip/Manage-Google-cloud-instances-with-images-templates, dated Jun. 29, 2018.
"Provisioning Virtual Machines and Hosts", Red Hat CloudForms 4.6, updated May 14, 2019.

* cited by examiner

1. USER OR PROCESS REGISTERS A CONNECTION TO A VIRTUALIZATION PLATFORM 250 USING ORCHESTRATION ENGINE 220

2. INTEGRATION SERVICE 230 DEPLOYS VIRTUAL MACHINE TO VIRTUALIZATION PLATFORM 250 WITH DEPLOYMENT INFORMATION, SUCH AS TEMPLATE IDENTIFIER (AND/OR LOCATION) AND NAME OF VIRTUAL MACHINE TO BE CREATED FROM TEMPLATE

3. INTEGRATION SERVICE 230 MAKES A SECURE CONNECTION TO THE TEMPLATE AND POLICY PROCESSING AGENT 260, USING THE SOFTWARE DEVELOPMENT KIT FOR THE TEMPLATE AND POLICY PROCESSING AGENT 260, AND PERFORMS THE NECESSARY API CALLS WITH THE DEPLOYMENT INFORMATION

4. THE TEMPLATE AND POLICY PROCESSING AGENT 260 REQUESTS TEMPLATE OF THE VIRTUAL MACHINE TO BE CREATED FROM INTEGRATION SERVICE 230 OR REMOTE STORAGE 290

5. INTEGRATION SERVICE 230 OR REMOTE STORAGE 290 SECURELY PROVIDES REQUESTED TEMPLATE TO THE TEMPLATE AND POLICY PROCESSING AGENT 260

6. THE TEMPLATE AND POLICY PROCESSING AGENT 260 UPLOADS THE TEMPLATE INTO INVENTORY OF THE VIRTUALIZATION PLATFORM 250 USING A CONNECTION TO THE APPLICATION PROGRAMMING INTERFACE 255

7. THE TEMPLATE AND POLICY PROCESSING AGENT 260 REPLICATES (CLONES) THE RECEIVED TEMPLATE TO CREATE THE VIRTUAL MACHINE TO BE GENERATED BASED ON THE DEPLOYMENT INFORMATION

8. THE TEMPLATE AND POLICY PROCESSING AGENT 260 MONITORS THE DEPLOYED VIRTUAL MACHINE TO ENFORCE ONE OR MORE POLICIES

FIG. 3

DEPLOYING VIRTUAL MACHINES TO A VIRTUALIZATION MANAGEMENT ENVIRONMENT USING AN AGENT TO OBTAIN REMOTE VIRTUAL MACHINE TEMPLATES

FIELD

The field relates generally to information processing, and more particularly to deploying virtual machines in information processing systems.

BACKGROUND

Information processing systems increasingly utilize virtual resources to meet changing user needs in an efficient, flexible and cost-effective manner. For example, cloud computing systems implemented using virtual resources such as virtual machines have been widely adopted. Such virtual resources may be used to provide at least a portion of the virtualization infrastructure of a given information processing system. However, significant challenges can arise in the deployment of virtual machines to a virtualization platform.

SUMMARY

Illustrative embodiments of the present disclosure provide techniques for deploying virtual machines to a virtualization management environment using an agent component to obtain remote virtual machine templates.

In one embodiment, a method comprises, in response to receiving, by an agent component executing in a virtualization management server, a request to deploy a virtual machine and a storage location of a template for the virtual machine, the agent component performing the following steps: obtaining the template for the virtual machine from one or more of an orchestration engine and a remote data source identified by the storage location; and replicating the obtained template for the virtual machine to create the virtual machine.

In some embodiments, the request to deploy the virtual machine further comprises deployment information used to configure the virtual machine. For example, the deployment information may comprise an identifier of the template for the virtual machine and/or a name of the virtual machine. The replicating of the obtained template for the virtual machine to create the virtual machine may also comprise processing at least some of the deployment information to configure the virtual machine.

In one or more embodiments, the method further comprises, by the agent component, monitoring an execution of the created virtual machine and evaluating one or more policies provided by the orchestration engine with respect to one or more of (i) security controls for the created virtual machine and (ii) network requirements associated with the created virtual machine. The agent component may initiate one or more automated remedial actions in response to a detection of a violation of one or more of the policies.

These and other illustrative embodiments include, without limitation, methods, apparatus, networks, systems and processor-readable storage media.

BRIEF DESCRIPTION OF THE DRAWINGS

FIG. 3 illustrates exemplary pseudo code for a virtual machine deployment process that uses an agent to obtain remote virtual machine templates in an illustrative embodiment;

DETAILED DESCRIPTION

Figure 1:
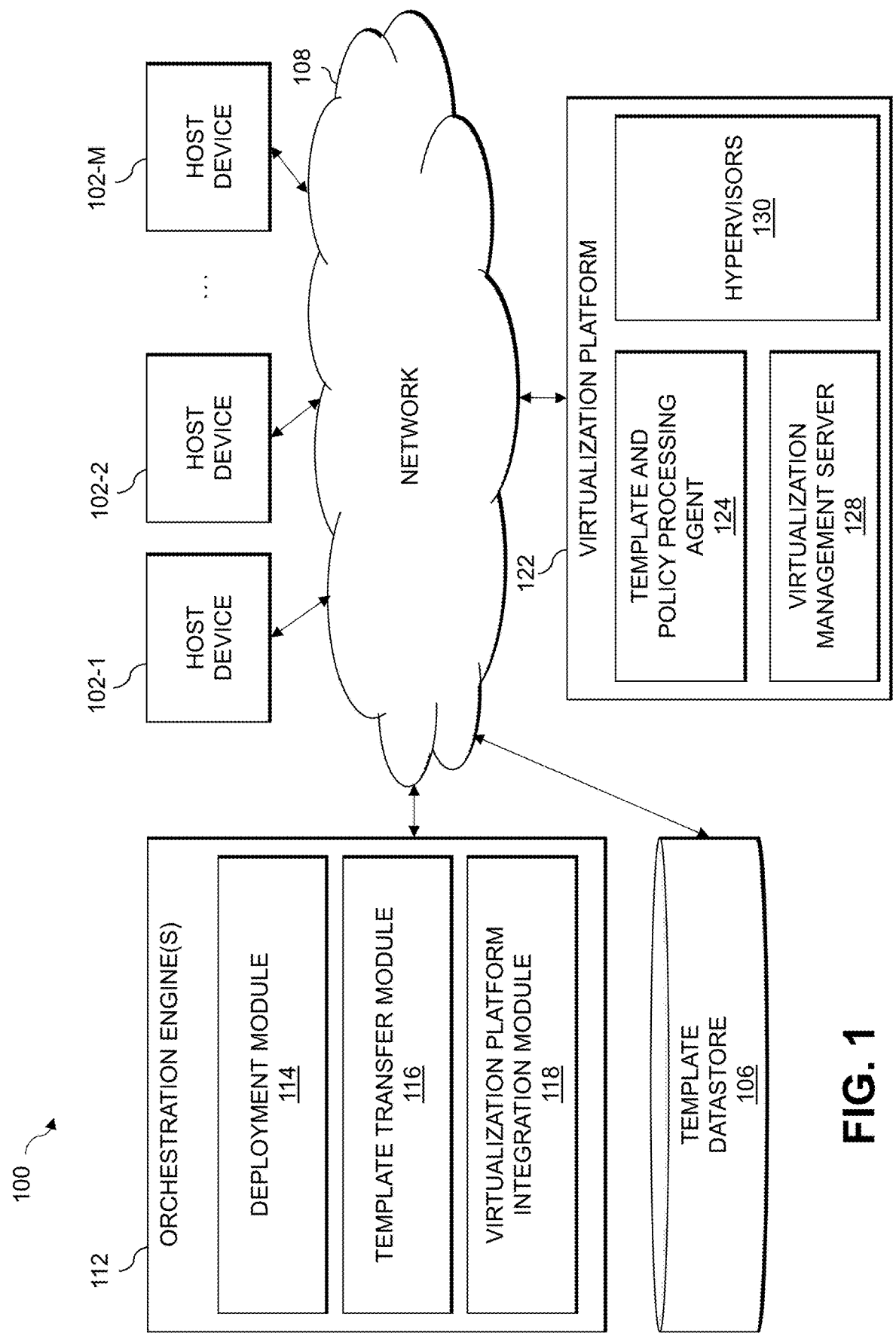
FIG. 1 is a block diagram of an information processing system for deploying virtual machines to a virtualization management environment using an agent to obtain remote virtual machine templates in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

A virtualization platform enables customers to execute virtual machines. Automation systems, such as orchestration engines, often seek to deploy workloads to the virtualization platform. Such automation systems, however, often lack an ability to monitor the virtual machine execution in order to enforce applicable policies, such as policies related to security controls (e.g., unauthorized intrusion/access of a virtual machine or other anomalous behavior) and network requirements associated with a deployed virtual machine. In addition, there is often a rigorous set of prerequisites that ensure that the needed components are in place to allow such deployments to succeed.

An orchestration engine often needs to deploy workloads to an external compute platform, such as a virtualization platform. In one or more embodiments, an orchestration engine deploys virtual machines to a virtualization platform using an agent component to obtain one or more needed virtual machine templates that are not available to the virtualization platform at the time of deployment. The disclosed agent component executes in the virtualization platform environment and serves as a conduit between the orchestration engine and the virtualization platform. The agent component may comprise a software agent and is sometimes referred to herein in some embodiments as an agent executing in a virtualization management server.

In one or more embodiments, the disclosed agent component for virtual machine deployment to a virtualization platform can obtain a template for a deployed virtual machine (e.g., that is not already in the inventory of the virtualization platform) from the orchestration engine or from a network-accessible location identified by the orchestration engine, or determined by the agent component, when needed. The disclosed agent component may also cache the obtained template and/or upload the obtained template into the inventory of the virtualization platform. The disclosed agent component may monitor the deployed virtual machine using a persistent connection to detect, for example, intrusions and/or anomalous behavior. The disclosed agent component may initiate one or more automated remedial actions upon detection of an intrusion and/or anomalous behavior, such as sending an alert and/or suspending operations of the deployed virtual machine.

In some embodiments, the disclosed agent component may obtain the applicable policies from the orchestration engine, an information technology professional and/or a customer. Thereafter, in at least some embodiments, the disclosed agent component may work autonomously to monitor the deployed virtual machine to mitigate any policy violations, such as a large geographic separation, a high network latency, and/or intermittent disconnections.

FIG. 1 shows an information processing system 100 configured in accordance with an illustrative embodiment to deploy virtual machines to a virtualization management environment using an agent component to obtain remote virtual machine templates. The information processing system 100 comprises one or more host devices 102-1, 102-2, . . . 102-M (collectively, host devices 102) and an orchestration engine 112 that communicate over a network 108 with one or more virtualization platforms 122. The orchestration engine 112 may deploy one or more virtual machines applications to the virtualization platform 122.

The host devices 102, orchestration engine 112 and/or virtualization platform 122 illustratively comprise respective computers, servers or other types of processing devices capable of communicating with one another via the network 108. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be at least partially implemented outside of the cloud infrastructure context, as in the case of a stand-alone computing and storage system implemented within a given enterprise.

In the FIG. 1 embodiment, the orchestration engine 112 further includes a deployment module 114, a template transfer module 116 and a virtualization platform integration module 118. The deployment module 114 is configured in some embodiments to deploy one or more virtual machines (not shown in FIG. 1). The template transfer module 116 may be configured to transfer virtual machine templates to and/or from the host devices 102, virtualization platform 122 and/or a template datastore 106, discussed below. The virtualization platform integration module 118 (which may be implemented, for example, at least in part as a vSphere™ integration service) integrates the orchestration engine 112 with the virtualization platform 122.

At least portions of the functionality of the deployment module 114, the template transfer module 116 and/or the virtualization platform integration module 118 may be implemented at least in part in the form of software that is stored in memory and executed by a processor.

The virtualization platform 122, as shown in FIG. 1, comprises a template and policy processing agent 124, a virtualization management server 128 and one or more hypervisors 130. The exemplary template and policy processing agent 124 implements at least a portion of the agent-based virtual machine deployment techniques described herein, such as obtaining one or more needed virtual machine templates that are not available to the virtualization platform 122 at the time of a virtual machine deployment, and processing the obtained virtual machine templates to replicate (e.g., clone) a needed virtual machine using the template and associated deployment information, as discussed below. In addition, in at least some embodiments, the template and policy processing agent 124 monitors the deployed virtual machine to enforce one or more policies. In some embodiments, the exemplary template and policy processing agent 124 may be an agent of the orchestration engine 112. The virtualization management server 128 provides one or more functions for managing at least portions of the virtualization platform 122. In addition, the exemplary virtualization platform 122 further comprises one or more hypervisors 130 to execute one or more deployed virtual machines.

Additionally, the host devices 102, the orchestration engine 112 and/or the virtualization platform 122 can have an associated template datastore 106 configured to store virtual machine templates, as discussed further below in conjunction with FIG. 2, for example. The template datastore 106 in the present embodiment can be implemented using storage provided by one or more of the host devices 102 and/or a storage system (not shown), or the template datastore 106 can be accessed over the network 108. Such storage systems can comprise any of a variety of different types of storage including network-attached storage (NAS), storage area networks (SANs), direct-attached storage (DAS) and distributed DAS, as well as combinations of these and other storage types, including software-defined storage. While the template datastore 106 is shown in FIG. 1 as a single datastore, the template datastore 106 may be implemented using multiple datastores, as would be apparent to a person of ordinary skill in the art.

The host devices 102, the orchestration engine 112 and/or the virtualization platform 122 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the orchestration engine 112 (or one or more components thereof such as the deployment module 114, template transfer module 116 and/or virtualization platform integration module 118) and the virtualization platform 122 may be implemented on respective distinct processing platforms, although numerous other arrangements are possible. For example, in some embodiments at least portions of one or more of the host devices 102, the orchestration engine 112 and the virtualization platform 122 are implemented on the same processing platform. The orchestration engine 112 and/or the virtualization platform 122 can therefore be implemented at least in part within at least one processing platform that implements at least a subset of the host devices 102.

The network 108 may be implemented using multiple networks of different types to interconnect storage system components. For example, the network 108 may comprise a portion of a global computer network such as the Internet, although other types of networks can be employed, including a wide area network (WAN), a local area network (LAN), a satellite network, a telephone or cable network, a cellular network, a wireless network such as a WiFi or WiMAX network, or various portions or combinations of these and other types of networks. The network 108 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The virtualization platform 122 in some embodiments may be implemented as part of a cloud-based system.

The host devices 102, the orchestration engine 112 and/or the virtualization platform 122 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The virtualization platform 122 and the orchestration engine 112 may be implemented at least in part in the first geographic location, the second geographic location, and one or more other geographic locations. Thus, it is possible in some implementations of the system 100 for different ones of the host devices 102, the orchestration engine 112, and the virtualization platform 122 to reside in different data centers.

Numerous other distributed implementations of the host devices 102, the orchestration engine 112, and/or the virtualization platform 122 are possible. Accordingly, the host devices 102, the orchestration engine 112, and/or the virtualization platform 122 can also be implemented in a distributed manner across multiple data centers.

Additional examples of processing platforms utilized to implement portions of the system 100 in illustrative embodiments will be described in more detail below in conjunction with FIGS. 5 and 6.

It is to be understood that the particular set of elements shown in FIG. 1 for deploying one or more virtual machines to a virtualization management environment using an agent to obtain remote virtual machine templates is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

For example, the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
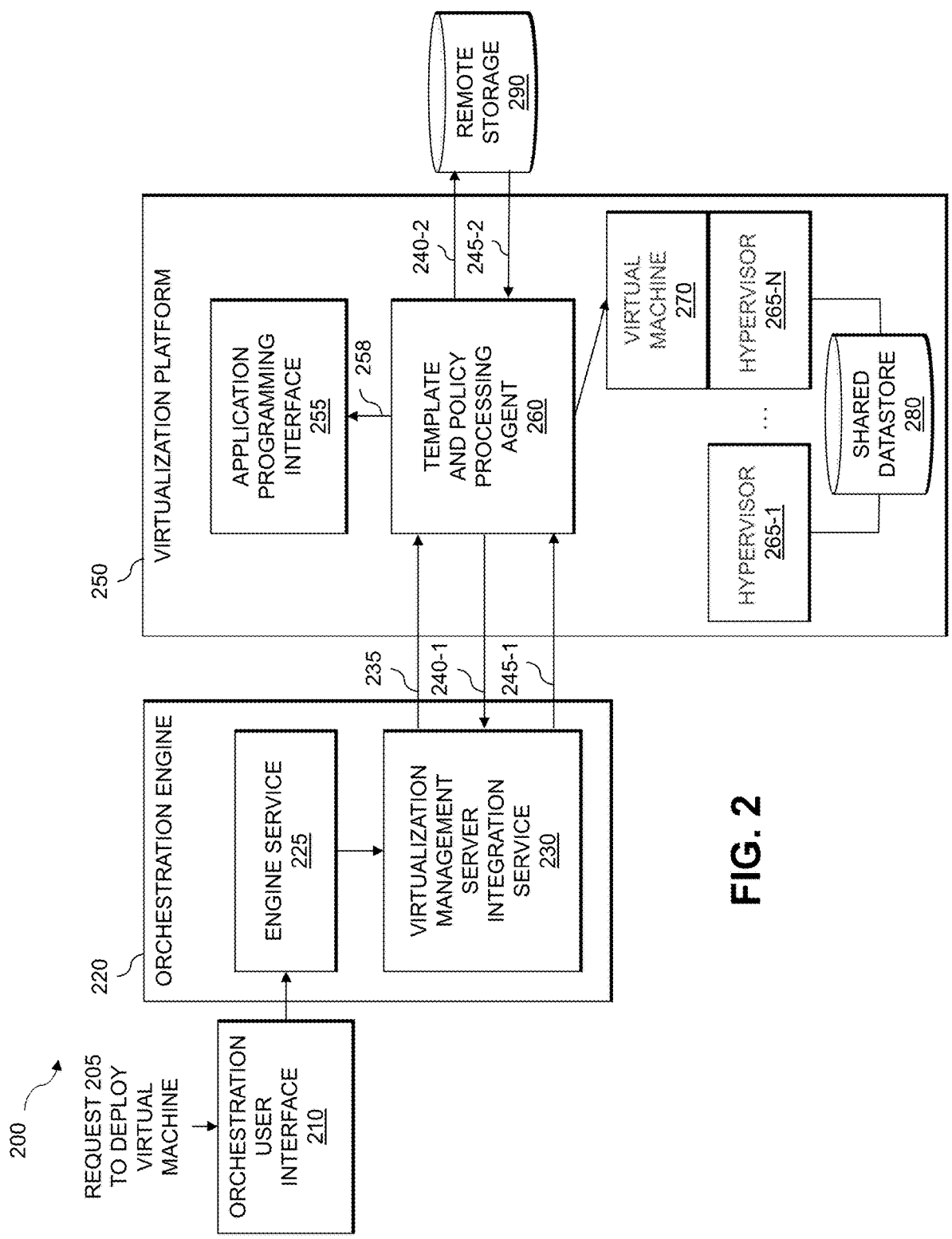
FIG. 2 illustrates portions of the information processing system of FIG. 1 in further detail in an illustrative embodiment.

FIG. 2 illustrates portions of the information processing system of FIG. 1 in further detail in an illustrative embodiment. In the example of FIG. 2, a user or a process submits a request 205 to deploy a virtual machine using an orchestration user interface 210 of an orchestration engine 220. In response to the request 205 to deploy a virtual machine, an engine service 225 of the orchestration engine 220 calls the virtualization management server integration service 230 and provides a template identifier (and/or a storage location) associated with the template and a name of the virtual machine to be created from the template. In some embodiments, the request 205 may also comprise a port group of the virtualization management server integration service 230, a datastore of the virtualization management server integration service 230, and other parameters. The necessary template may be stored, for example, in an inventory of the orchestration engine 220 and/or a network-bound location.

The virtualization management server integration service 230 may be implemented, for example, at least in part as a vSphere™ integration service. The virtualization management server integration service 230 makes a secure connection 235 to a template and policy processing agent 260 of a virtualization platform 250, for example, using mTLS (Mutual Transport Layer Security) and certificates and a software development kit embedded in the virtualization management server integration service 230 to perform the necessary API calls to the template and policy processing agent 260 with the appropriate payloads and parameters.

In some embodiments, the template and policy processing agent 260 can be implemented, for example, using a container and/or a virtual machine and acts as an integration agent for orchestration engine 220.

If the template and policy processing agent 260 determines that the indicated template is not available in the inventory of the virtualization platform 250, the template and policy processing agent 260 will request the template from the orchestration engine 220, using a connection 240-1, or from a remote storage 290 identified by the provided storage location of the template, using a connection 240-2. The orchestration engine 220 and/or the remote storage 290 provide the requested template, using a connection 245-1 or 245-2, respectively. In some embodiments, the contents of the requested template may be signed and verified.

Once the template and policy processing agent 260 obtains the requested template, the template and policy processing agent 260 may cache the requested template and/or upload the requested template into the inventory of the virtualization platform 250, for example, using an application programming interface 255 of the virtualization platform 250 by means of a connection 258.

In addition, the template and policy processing agent 260 replicates (e.g., clones) the obtained template to create a virtual machine 270 to be generated using the deployment information. The created virtual machine 270 executes on one or more of a plurality of hypervisors 265-1 through 265-N (such as VMware™ ESXi™ hypervisors). The hypervisors 265 share a shared datastore 280, for example, to store application information associated with the virtual machine 270 and other applications.

In some embodiments, the template and policy processing agent 260 monitors the deployed virtual machine to enforce one or more policies.

FIG. 3 illustrates exemplary pseudo code for a virtual machine deployment process 300 that uses an agent to obtain remote virtual machine templates in an illustrative embodiment. In the example of FIG. 3, a user or process registers a connection to a virtualization platform 250 in step 1, using the orchestration engine 220. The virtualization management server integration service 230 then deploys a virtual machine to the virtualization platform 250 in step 2 with deployment information, such as a template identifier (and/or a storage location) and name of the virtual machine to be created from the template identified by the template identifier.

In step 3, the virtualization management server integration service 230 makes a secure connection to the template and policy processing agent 260, for example, using a software development kit for the template and policy processing agent 260, and performs the necessary API calls with the received deployment information. The template and policy processing agent 260 then requests the template of the virtual machine to be created in step 4 from the virtualization management server integration service 230 or from the remote storage 290, using the storage location.

In step 5, the virtualization management server integration service 230 or the remote storage 290 securely provides the requested template to the template and policy processing agent 260. The template and policy processing agent 260 uploads the received template into the inventory of the virtualization platform 250 in step 6, for example, using a connection to the application programming interface 255.

The template and policy processing agent 260 replicates the replicates (e.g., clones) the received template in step 7 to create the virtual machine to be generated based on the deployment information. In step 8, the template and policy processing agent 260 monitors the deployed virtual machine to enforce one or more policies, as described herein.

Figure 4:
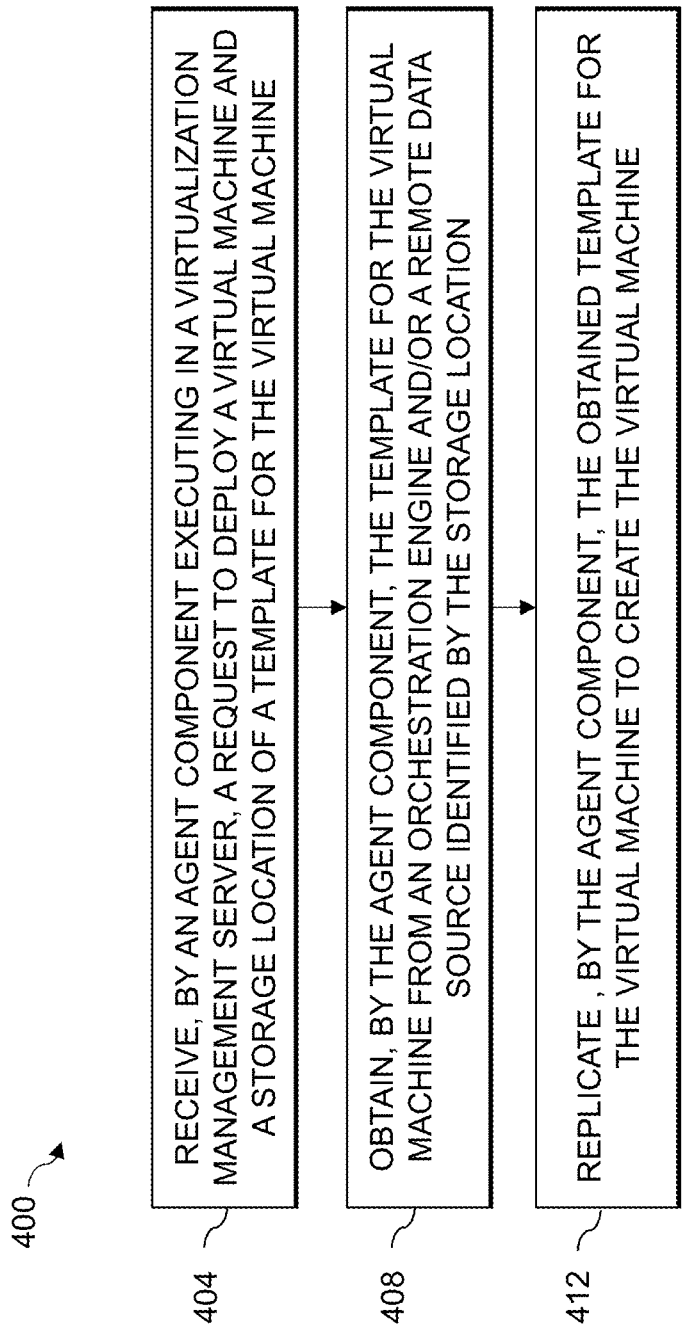
FIG. 4 is a flow diagram illustrating an exemplary implementation of a virtual machine deployment process that uses an agent to obtain remote virtual machine templates in an illustrative embodiment.

FIG. 4 is a flow diagram illustrating an exemplary implementation of a virtual machine deployment process 400 that uses an agent to obtain remote virtual machine templates in an illustrative embodiment. In the example of FIG. 4, the process 400 includes steps 404 through 412. These steps are assumed to be performed by the template and policy processing agent 260 of the virtualization platform 250. The process begins at step 404, where an agent component executing in a virtualization management server receives a request to deploy a virtual machine and a storage location of a template for the virtual machine. In some embodiments, the storage location of the template for the virtual machine may comprise an identifier of the virtual machine (and/or an identifier of the template), and the template and policy processing agent 260 (or another entity) may utilize the identifier to determine a location (e.g., by performing a lookup in a directory using the identifier) from where the template may be obtained.

The agent component then obtains the template for the virtual machine in step 408 from an orchestration engine and/or a remote data source identified by the storage location. In step 412, the agent component replicates the obtained template for the virtual machine to create the virtual machine.

In some embodiments, the request to deploy the virtual machine further comprises deployment information used to configure the virtual machine. The deployment information may comprise an identifier of the template for the virtual machine and/or a name of the virtual machine. The replicating of the obtained template for the virtual machine to create the virtual machine may process at least some of the deployment information to configure the virtual machine.

The agent may monitor an execution of the created virtual machine in some embodiments and evaluate one or more policies provided by the orchestration engine with respect to (i) security controls (e.g., to prevent an unauthorized intrusion or access of the virtual machine or other anomalous behavior) and/or (ii) network requirements associated with the created virtual machine. In addition, the agent may initiate one or more automated remedial actions in response to a detection of a violation of one or more of the policies.

Figure 5:
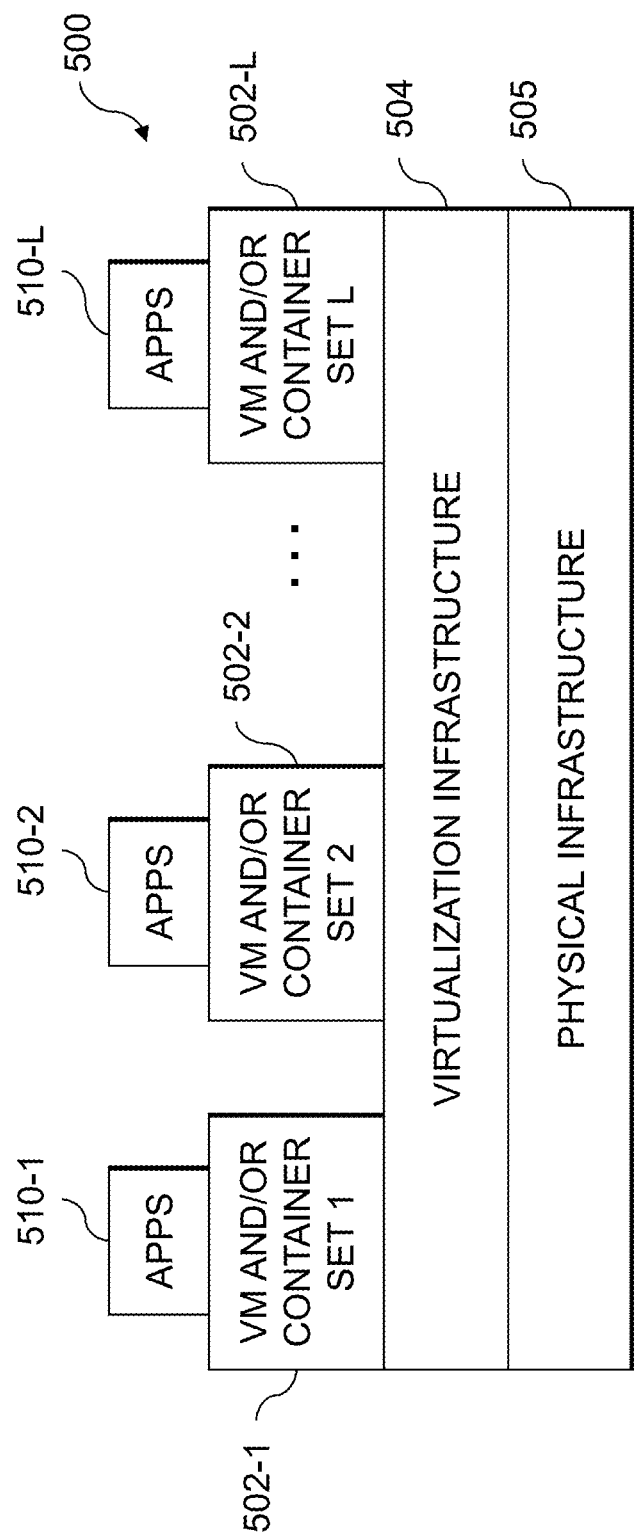
FIGS. 5 and 6 show examples of processing platforms that may be utilized to implement at least a portion of an information processing system in illustrative embodiments.
Figure 6:
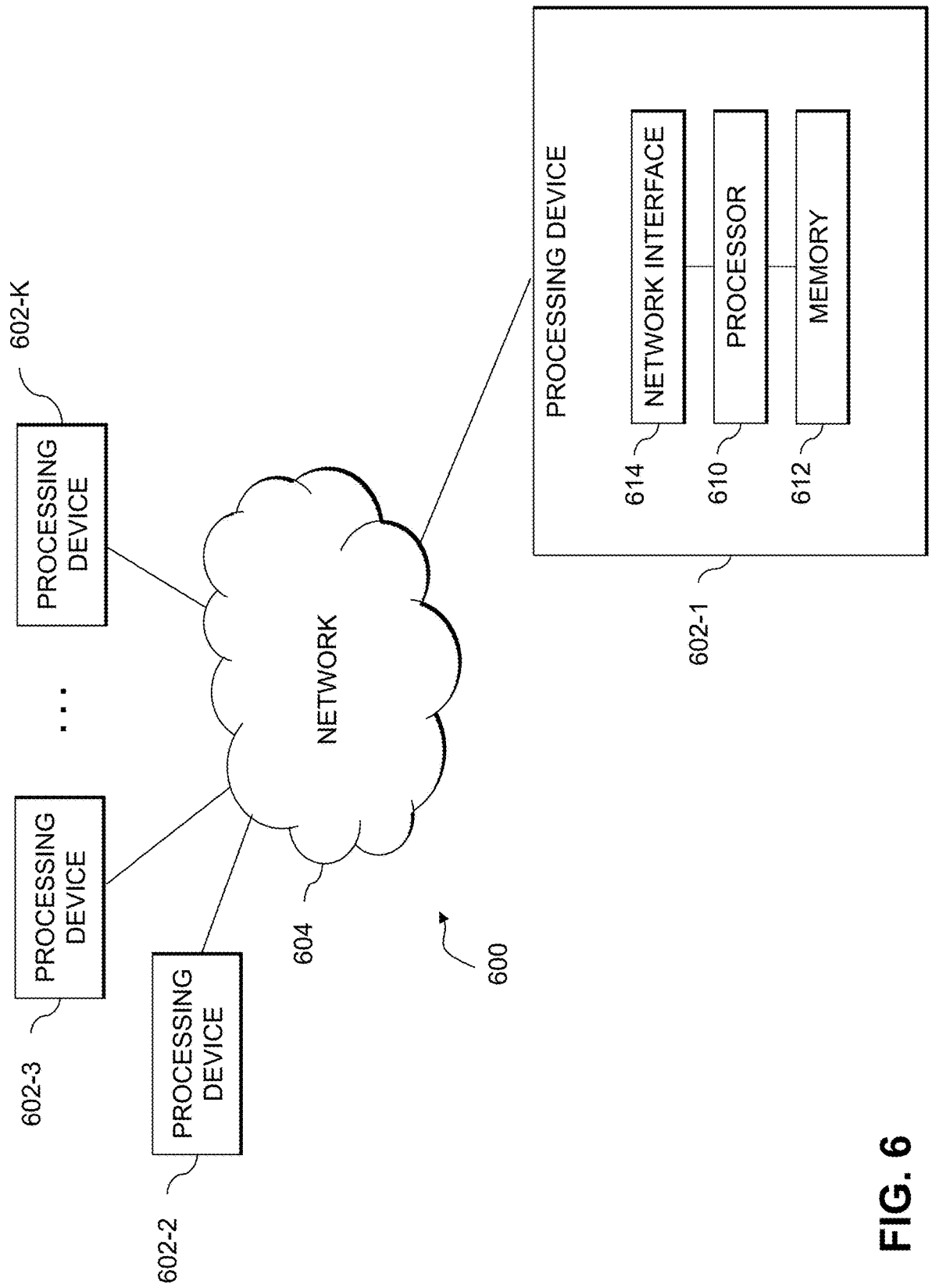

The particular processing operations and other system functionality described in conjunction with the pseudo code and flow diagrams of FIGS. 4 and 5 are presented by way of illustrative example only, and should not be construed as limiting the scope of the disclosure in any way. Alternative embodiments can use other types of processing operations for deploying virtual machines to a virtualization management environment using an agent to obtain remote virtual machine templates. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different selective storage drive powering processes for respective different storage nodes 105 of an information processing system.

Advantageously, the virtual machine deployment techniques described herein allow a virtual machine to be deployed to a virtualization platform even when a template for the deployed virtual machine is not available in an inventory of the virtualization platform. In addition, the agent-based virtual machine deployment techniques provide a mechanism for the agent to monitor an execution of a deployed virtual machine and to detect and mitigate any violations of one or more applicable policies.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for deploying virtual machines to a virtualization management environment using an agent to obtain remote virtual machine templates will now be described in greater detail with reference to FIGS. 5 and 6. Although described in the context of system 100, these platforms may also be used to implement at least portions of other information processing systems in other embodiments.

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple VMs and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for deploying virtual machines to a virtualization management environment using an agent to obtain remote virtual machine templates as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container orchestrators, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
in response to receiving, by an agent component executing in a virtualization management server, a request to deploy a virtual machine and a storage location of a template for the virtual machine, the agent component performing the following steps:
obtaining the template for the virtual machine from one or more of an orchestration engine and a remote data source identified by the storage location; and
replicating the obtained template for the virtual machine to create the virtual machine;
wherein the method is performed by at least one processing device comprising a processor coupled to a memory.

2. The method of claim 1, further comprising storing the obtained template for the virtual machine in an inventory of the virtualization management server.

3. The method of claim 1, wherein the request to deploy the virtual machine further comprises deployment information used to configure the virtual machine.

4. The method of claim 3, wherein the deployment information comprises one or more of an identifier of the template for the virtual machine and a name of the virtual machine.

5. The method of claim 3, wherein the replicating of the obtained template for the virtual machine to create the virtual machine further comprises processing at least some of the deployment information to configure the virtual machine.

6. The method of claim 1, wherein the agent component communicates with the one or more of the orchestration engine and the remote data source using a secure connection.

7. The method of claim 1, further comprising, by the agent component, monitoring an execution of the created virtual machine and evaluating one or more policies provided by the orchestration engine with respect to one or more of (i) security controls for the created virtual machine and (ii) network requirements associated with the created virtual machine.

8. The method of claim 7, further comprising, by the agent component, initiating one or more automated remedial actions in response to a detection of a violation of one or more of the policies.

9. An apparatus comprising:
at least one processing device comprising a processor coupled to a memory;
the at least one processing device being configured to implement the following steps:
in response to receiving, by an agent component executing in a virtualization management server, a request to deploy a virtual machine and a storage location of a template for the virtual machine, the agent component performing the following steps:
obtaining the template for the virtual machine from one or more of an orchestration engine and a remote data source identified by the storage location; and
replicating the obtained template for the virtual machine to create the virtual machine.

10. The apparatus of claim 9, wherein the request to deploy the virtual machine further comprises deployment information used to configure the virtual machine.

11. The apparatus of claim 10, wherein the deployment information comprises one or more of an identifier of the template for the virtual machine and a name of the virtual machine.

12. The apparatus of claim 10, wherein the replicating of the obtained template for the virtual machine to create the virtual machine further comprises processing at least some of the deployment information to configure the virtual machine.

13. The apparatus of claim 9, further comprising, by the agent component, monitoring an execution of the created virtual machine and evaluating one or more policies provided by the orchestration engine with respect to one or more of (i) security controls for the created virtual machine and (ii) network requirements associated with the created virtual machine.

14. The apparatus of claim 13, further comprising, by the agent component, initiating one or more automated remedial actions in response to a detection of a violation of one or more of the policies.

15. A non-transitory processor-readable storage medium having stored therein program code of one or more software programs, wherein the program code when executed by at least one processing device causes the at least one processing device to perform the following steps:
in response to receiving, by an agent component executing in a virtualization management server, a request to deploy a virtual machine and a storage location of a template for the virtual machine, the agent component performing the following steps:
obtaining the template for the virtual machine from one or more of an orchestration engine and a remote data source identified by the storage location; and
replicating the obtained template for the virtual machine to create the virtual machine.

16. The non-transitory processor-readable storage medium of claim 15, wherein the request to deploy the virtual machine further comprises deployment information used to configure the virtual machine.

17. The non-transitory processor-readable storage medium of claim 16, wherein the deployment information comprises one or more of an identifier of the template for the virtual machine and a name of the virtual machine.

18. The non-transitory processor-readable storage medium of claim 16, wherein the replicating of the obtained template for the virtual machine to create the virtual machine further comprises processing at least some of the deployment information to configure the virtual machine.

19. The non-transitory processor-readable storage medium of claim 15, further comprising, by the agent component, monitoring an execution of the created virtual machine and evaluating one or more policies provided by the orchestration engine with respect to one or more of (i) security controls for the created virtual machine and (ii) network requirements associated with the created virtual machine.

20. The non-transitory processor-readable storage medium of claim 19, further comprising, by the agent component, initiating one or more automated remedial actions in response to a detection of a violation of one or more of the policies.

* * * * *